H. PLATTS.

Billiard Cues.

No. 5,522. Reissued August 5, 1873.

WITNESSES.
Villette Anderson.
Geo. E. Upham,

INVENTOR.
Harvey Platts,
Chipman Hosmer & Co
Attys

AM. PHOTO-LITHOGRAPHIC CO. N.Y. (OSBORNE'S PROCESS.)

UNITED STATES PATENT OFFICE.

HERVEY PLATTS, OF ITHACA, NEW YORK.

IMPROVEMENT IN BILLIARD-CUES.

Specification forming part of Letters Patent No. 139,519, dated June 3, 1873; reissue No. 5,522, dated August 5, 1873; application filed July 26, 1873.

*To all whom it may concern:*

Be it known that I, HERVEY PLATTS, of Ithaca, in the county of Tompkins and State of New York, have invented certain new and useful Improvements in Billiard-Cues, of which the following is a full, clear, and accurate description, reference being had to the accompanying drawings, in which—

Figure 2:
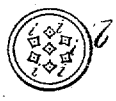
Figure 1:
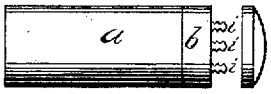

Figure 1 represents a side view of the end of a cue having my improvements with the tip removed. Fig. 2 is an end view, showing the points.

This invention has relation to means for securing the tips to billiard-cues; and it consists in the construction and novel arrangement of a number of rough or barbed points at the end of the cue, projecting therefrom, and adapted to enter the under side of the tip, for the purpose of securing the same in position without liability of rotation or other disarrangement. It also consists in providing the end of a billiard-cue with a band of soft metal, composition, or other material, which is sufficiently non-elastic to harmonize with the wood of the cue, and thus not to impair the effect of the stroke.

Heretofore, brass, iron, and other elastic metal ferrules have been used for cues; but they are objectionable, being springy and elastic.

In the accompanying drawings, the letter *a* represents the small end of a cue. *b* indicates the non-elastic band, which is secured around the end of the cue, so that its outer edge will be flush with the circular face of said end, and in contact, usually, with the under side of the tip at its circumference. Projecting from the end of the cue are a number of small points, *i*, having rough or barbed ends, which serve to secure the tip to the cue when the former is forced upon said points, so that they are embedded in its under side.

What I claim as my invention, and desire to secure by Letters Patent, is—

1. A billiard-cue having several rough or barbed points projecting from its end, adapted to hold the tip, and for the purpose substantially as specified.

2. The combination, with a billiard-cue, of the soft-metal or non-elastic tip-band *c*, substantially as specified.

In testimony that I claim the above I have hereunto subscribed my name in the presence of two witnesses.

HERVEY PLATTS.

Attest:
ABEL BURRITT,
P. G. ELLSWORTH.